United States Patent
Wasinger

[19]

[11] Patent Number: 5,905,770
[45] Date of Patent: May 18, 1999

[54] STORAGE FRAMEWORK FOR NUCLEAR REACTOR FUEL ELEMENTS

[75] Inventor: Karl Wasinger, Mühlheim, Germany

[73] Assignee: Siemens Aktiengesellschaft, Munich, Germany

[21] Appl. No.: 08/951,207

[22] Filed: Sep. 17, 1997

Related U.S. Application Data

[63] Continuation of application No. PCT/DE96/00448, Mar. 13, 1996.

[30] Foreign Application Priority Data

Mar. 17, 1995 [DE] Germany .......................... 195 09 214

[51] Int. Cl.$^6$ .................................................. G21C 19/07
[52] U.S. Cl. ............................................................ 376/272
[58] Field of Search ........................ 376/272; 250/506.1, 250/507.1

[56] References Cited

U.S. PATENT DOCUMENTS

| | | | |
|---|---|---|---|
| 4,088,897 | 5/1978 | Soot | 376/272 |
| 4,119,859 | 10/1978 | Karzmar et al. | 376/272 |
| 4,177,385 | 12/1979 | Bevilacqua | 376/272 |
| 4,305,787 | 12/1981 | Rivacoba | 376/272 |
| 4,630,738 | 12/1986 | Bosshard | 376/272 |
| 4,695,424 | 9/1987 | Flynn | 376/272 |
| 4,948,553 | 8/1990 | Machado et al. | 376/272 |
| 5,232,657 | 8/1993 | Kovacik et al. | 376/272 |
| 5,311,563 | 5/1994 | Schabert et al. | 376/272 |
| 5,384,813 | 1/1995 | Loftis et al. | 376/272 |

FOREIGN PATENT DOCUMENTS

| | | |
|---|---|---|
| 0120232A1 | 10/1984 | European Pat. Off. . |
| 0520438A1 | 12/1992 | European Pat. Off. . |
| 0537615A1 | 4/1993 | European Pat. Off. . |
| 2440060 | 10/1978 | France . |
| 2680909 | 3/1993 | France . |
| 94/20964 | 9/1994 | WIPO . |

OTHER PUBLICATIONS

Japanese Patent Abstract No. 5040195 (Kiyoshi et al.), dated Feb. 19, 1993.

*Primary Examiner*—Daniel D. Wasil
*Attorney, Agent, or Firm*—Herbert L. Lerner; Laurence A. Greenberg

[57] ABSTRACT

A storage framework for nuclear reactor fuel elements includes a baseplate on which a plurality of structural wells of essentially rectangular cross section are fastened. The structural wells stand upright on the baseplate and in each case are disposed approximately diagonally opposite one another in a checkered manner. Structural wells located diagonally opposite one another in each case span an interspace. A neutron-absorbing structure with boron-treated steel is disposed in the interspace and/or in the structural wells, is displaceable relative to the structural wells and has plates made from boron-treated steel. The plates form an essentially rectangular absorber well which does not take on any load-bearing functions of the storage framework. The absorber well is fixed in its position by spacers, in particular edge beads, on the plates.

8 Claims, 4 Drawing Sheets

STORAGE FRAMEWORK FOR NUCLEAR REACTOR FUEL ELEMENTS

CROSS-REFERENCE TO RELATED APPLICATION

This application is a continuation of International application Ser. No. PCT/DE96/00448, filed Mar. 13, 1996.

BACKGROUND OF THE INVENTION

1. Field of the Invention

The invention relates to a storage framework for nuclear reactor fuel elements, having a plurality of structural wells of essentially rectangular cross section fastened on a baseplate.

In order to provide for the intermediate storage of spent fuel elements from a nuclear power plant, in particular a pressurized water or boiling water reactor, the fuel elements are stored within the nuclear power plant, in particular within fuel element storage basins. It is desirable for technical and economic reasons to utilize the available storage space as efficiently as possible. In order to increase the storage capacity, storage frameworks with incorporated nuclear poison, for example with boron-containing material, are employed. The storage framework, while having sufficient mechanical stability and neutron-absorbing properties, should require as little space as possible for itself, in order to allow a high loading density for spent fuel elements.

Published European Patent Application 0 537 615 A1, corresponding to U.S. Pat. No. 5,311,563, specifies a storage framework for nuclear reactor fuel elements, in which a plurality of wells of essentially rectangular cross section are fastened on a baseplate, the wells standing vertically on the baseplate and in each case being disposed diagonally opposite one another in a checkered manner. Some of the wells located diagonally opposite one another are in each case connected to one another, along their mutually adjoining longitudinal edges with an offset, through the use of at least two connecting elements that bridge a gap formed by the offset. The pair of longitudinal edges is assigned at least one first connecting element of high rigidity, in each case in a first direction parallel to the baseplate, and at least one second connecting element of high rigidity, in each case in a second direction parallel to the baseplate. Due to the high rigidity of the connecting elements, internal transverse forces acting on the storage framework can be absorbed, without the need for an additional supporting grid in the upper region of the storage framework. It is thus also possible to load the interspaces of the storage framework which are not provided with wells, so that intermediate positions or intermediate locations for fuel elements are formed. In order to provide neutron absorption, the walls of the wells of the storage framework are composed of austenitic boron steel with a boron content of up to 2%, and the connecting elements are composed of a soft austenitic steel, the carbon content of which is lower than 0.1%. As a result, when extreme external forces act on the storage framework, the boron steel wells experience virtually no deformation, since the external forces are absorbed, where appropriate, by virtue of plastic deformations of the connecting elements. The use of an austenitic boron steel as a load-bearing structure for the wells makes those wells particularly complicated to manufacture, in order to ensure the required mechanical stability of the boron-treated steel.

Further embodiments of a storage framework for spent fuel elements, in which the respective storage framework has a neutron-absorbing material, are disclosed, for example, in U.S. Pat. No. 4,088,897, U.S. Pat. No. 4,630,738, U.S. Pat. No. 4,695,424 and U.S. Pat. No. 4,119,859. A fact common to the storage frameworks known from those publications is that the neutron-absorbing material is integrated firmly into the load-bearing structure of the storage framework. In the storage framework disclosed in U.S. Pat. No. 4,088,897, boron-containing material is disposed between an inner and an outer wall of a well for receiving a spent fuel element. In the storage framework known from U.S. Pat. No. 4,630,738, a plurality of square neutron-absorbing wells parallel to one another on a baseplate are connected firmly to the baseplate, with the neutron-absorbing material, in the form of plates made from sintered boron-treated aluminum, being fastened firmly to the respective sides of the rectangular well. The boron-treated plates are disposed between an inner and an outer well. U.S. Pat. No. 4,695,424 discloses a storage framework, in which the neutron-absorbing material, for example a boron carbide, in the form of plates is non-displaceably fastened, particularly welded, to the outside of a well for receiving spent fuel elements. U.S. Pat. No. 4,119,859 describes a storage framework for fuel elements of a nuclear power plant, with wells for receiving a fuel element in each case. There, the wells have a sandwich structure with an inner wall and an outer wall, between which a neutron-absorbing material, for example boron carbide, is intercalated.

The known measures for introducing neutron-absorbing material into a fuel element storage framework involve integrating the neutron-absorbing material firmly into the load-bearing structure of the fuel element storage basin, thus necessitating a considerable construction outlay in production terms and, where appropriate, requiring a monitoring of the neutron-absorbing material.

SUMMARY OF THE INVENTION

It is accordingly an object of the invention to provide a storage framework for nuclear reactor fuel elements, which overcomes the hereinafore-mentioned disadvantages of the heretofore-known devices of this general type and which ensures easier assembly, a high stability of an entire interconnected well system, a high loading density as well as uncoupling of neutron-absorbing material from load-bearing structures of the interconnected well system.

With the foregoing and other objects in view there is provided, in accordance with the invention, a storage framework for nuclear reactor fuel elements, comprising a baseplate; a plurality of structural wells of substantially rectangular cross section fastened on and standing upright on the baseplate, the structural wells disposed approximately diagonally opposite one another in a checkered manner, and each two of the structural wells disposed diagonally opposite one another spanning an interspace; a neutron-absorbing structure with boron-treated steel disposed in at least one of an interspace and a structural well for displacement relative to the structural wells, and the neutron-absorbing structure having at least a partial region with spacers, such as strips, plates or edge beads, toward a respective one of the structural wells.

Due to the above-described separation of the load-bearing function in the structural wells from the function of neutron absorption, the structural wells intended for receiving the fuel elements can be manufactured simply from known non-boron-treated austenitic steel or other steels permitted for this purpose, in particular in mass production. The neutron-absorbing structure has no load-bearing function of any kind, so that the use of boron-treated steel presents no problem at all both from a production standpoint and for reasons of mechanical stability. By virtue of an appropriate shaping of the neutron-absorbing structure, the interspace may likewise be used for receiving spent fuel elements. The use of boron-treated steel additionally has the advantage that there is no need to monitor the neutron absorption capacity. The boron-treated steel has, for example, a boron fraction of up to 2%. It is likewise possible to place the structure in the structural wells, in which case a configuration both in the structural wells and in the interspaces is particularly effective, since two layers of, for example, plates made from boron-treated steel are thereby laid one behind the other, with the result that it is also possible to store fuel elements having relatively high radioactive radiation capacity.

Since the neutron-absorbing structure is constructed so as to be displaceable relative to the structural wells, an exchange of the structure can be carried out, for example if it becomes necessary to adapt the shape of the structure to the fuel elements to be received. Furthermore, this ensures that mechanical forces are transmitted to the structure at most to only a slight degree. Moreover, a displaceable structure is suitable for the retrofitting of existing fuel element storage frameworks.

In accordance with another feature of the invention, the neutron-absorbing structure has plates made of boron-treated steel which, particularly for especially effective neutron absorption, are disposed essentially parallel to the side walls of the structural wells.

In accordance with a further feature of the invention, the plates are connected to an essentially rectangular absorber well which, as a non-load-bearing element, merely has to have sufficient self-supporting stability. Such an absorber well may also be inserted into a formed interspace after an interconnected storage framework system has been produced from the structural wells.

In accordance with an added feature of the invention, the absorber well is formed in each case from four plates which are connected releasably to one another, in particular intermeshed. As a result, the absorber well formed from the plates connected releasably to one another is held in its position by the structural wells surrounding it, thereby forming a preferably rectangular cell which is loosely installed and is not subjected to load. This cell formed by the absorber well is, in turn, suitable for receiving a spent fuel element.

In accordance with an additional feature of the invention, in order to support and position the absorber well, at least some of the plates adjoin a respective structural well in at least a part region. For this purpose, the plates have suitable spacers, such as strips or distance plates. The plates may also have edge beads that are bent outward, that is to say bent toward the side walls of the structural wells, particularly in order to improve the utilization of the corners formed by the structural wells.

In accordance with yet another feature of the invention, a structural well has, at an end located opposite the baseplate, a guide strip which, in particular, runs parallel to the baseplate and points into the interspace and through the use of which an unintentional removal of the neutron-absorbing structure from the interspace, for example when a fuel element disposed therein is extracted, is avoided.

In accordance with yet a further feature of the invention, in order to increase the mechanical stability of the fuel element storage framework which is constructed from the structural wells, structural wells located diagonally opposite one another are in each case connected at the corresponding longitudinal edges through at least one connecting element, the connecting element having high rigidity and running in a first direction parallel to the baseplate. The connection, in particular a welded connection, of the structural wells to the connecting element, forms a mechanically stable interconnected system of load-bearing structural wells for receiving spent fuel elements.

In accordance with a concomitant feature of the invention, in order to provide a further increase in mechanical stability, a further connecting element of high rigidity, which runs along a second direction parallel to the baseplate, is provided at the longitudinal edges. There is an angle which is preferably between 70° and 90° between the first direction and the second direction. The connecting elements accordingly run largely perpendicularly to one another and intersect within the gap present between the longitudinal edges of the structural wells located diagonally opposite one another. The structural wells are thereby fixed within the plane spanned by the baseplate and forces occurring between them are absorbed by the connecting elements.

Other features which are considered as characteristic for the invention are set forth in the appended claims.

Although the invention is illustrated and described herein as embodied in a storage framework for nuclear reactor fuel elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
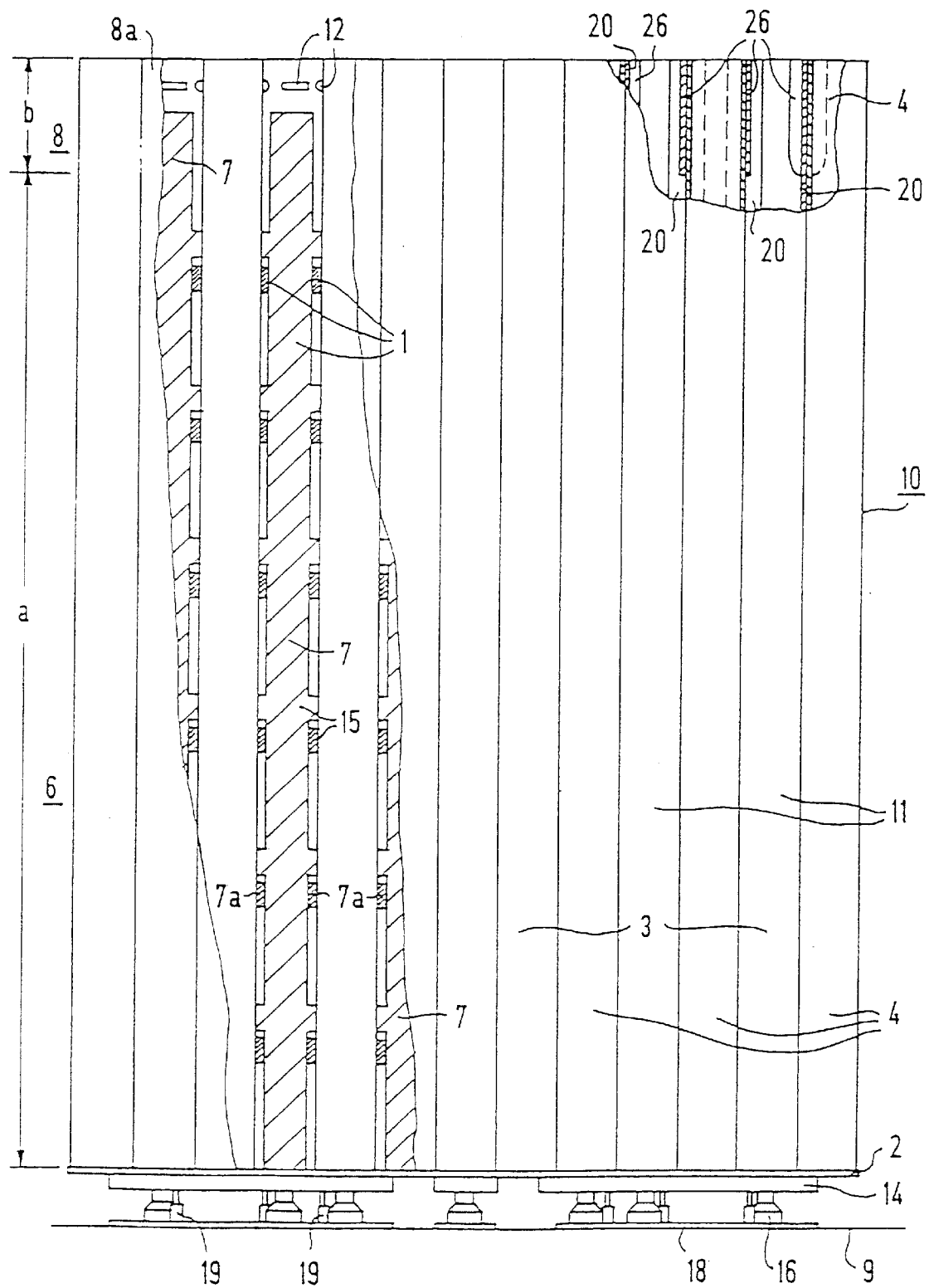
FIG. 1 is a diagrammatic, partly broken-away, side-elevational view of a fuel element storage framework.

Referring now to the figures of the drawings in detail and first, particularly, to FIG. 1 thereof, there is seen a plurality of structural wells 4 which are fastened upright on a baseplate 2 in a storage framework for nuclear reactor fuel elements. An outer wall 10 of the storage framework is visible in a side view in the figure. The structural wells 4 are disposed on the baseplate in a checkered manner, so that the outer wall 10 is formed alternately by side walls of the wells and by edge plates 11 welded onto the these side walls. The side walls are identified by reference numerals 44 to 47 in FIG. 2 and will be explained in more detail below. Due to the checkered or checkerboard-type configuration of the structural wells 4, two structural wells adjoining one another diagonally in each case span interspaces 3 which have approximately the same cross-sectional area as the structural wells 4.

Reinforcing slabs 14, which are provided with feet 16, are disposed on the baseplate 2. The feet 16 rest on foot slabs 18 disposed on a bottom 9 of the fuel element storage basin, which is not illustrated in any more detail in FIG. 1. The feet 16 are screwed into the reinforcing slabs 14 through the use of a coarse thread having a thread pitch of 6 mm. Clamping bolts 19 for bracing the feet 16 in the coarse thread are provided between the reinforcing slab 14 and the foot slab 18. The storage framework rests freely, without lateral fixing, on the bottom 9 of the fuel element storage basin.

The structural wells 4 are connected to one another through the use of first and second connecting elements 20 and 26. A view of the side walls of the structural wells 4 disposed in a second row, which side walls are located behind the edge plates 11, is exposed in an upper right region of the figure. The first connecting elements 20 and the second connecting elements 26 can be seen alternately in a top view of their flat side and in a section through their narrow side, wherein in the first instance one half is concealed in each case by a structural well 4 located in front.

In the example of FIG. 1, the lower first connecting elements 20 extend over an entire height a+b of the structural wells 4, that is to say over a lower region 6 and over an upper region 8. In order to make it possible for the second connecting elements 26 to be welded easily, they extend only in the upper region 8 over a length b which is less than 25% of the total height a+b of the structural wells 4. If the total height of the structural wells 4 is about 4.5 m, two connecting elements 26 having a length of between 300 mm and 500 mm are provided, in particular.

The structural wells 4 are composed of austenitic steels qualified for use in nuclear power plants and are constructed as wells of approximately square cross section. The connecting elements are composed of a ductile austenitic steel having a low carbon content, particularly of less than 0.1%.

The left-hand part of FIG. 1 illustrates a view of the side walls of the structural wells 4 disposed in the second row and of the spaces 3 located therebetween, over the entire height a+b of the structural wells 4. The side walls are located behind the edge surfaces 11. A guide strip 12 is located in the upper region 8 of the fuel element storage framework, at an end 8a of the structural wells 4 which is opposite the baseplate 2. The guide strip 12 runs parallel to the plane of the baseplate, on the outside of the structural well 4, that is to say on the side facing the interspace 3. A neutron-absorbing structure 1 which is located below this guide strip 12 in the interspace 3, is displaceable relative to the structural wells 4 and is composed of plates 7 made of boron-treated steel. Altogether, four such plates 7, 7a are disposed in an interspace 3. The plates extend largely over the entire height a+b of the fuel element storage framework and in each case run parallel to a side wall of the structural wells 4 surrounding the interspace 3. The plates 7, 7a have a plurality of projections over the entire height a+b. The plates 7, 7a, which in each case are perpendicular to one another, intermesh through the use of the projections. A self-supporting absorber well 15 is thereby formed from the plates 7, 7a. The absorber well is disposed within the interspace 3.

Figure 2:
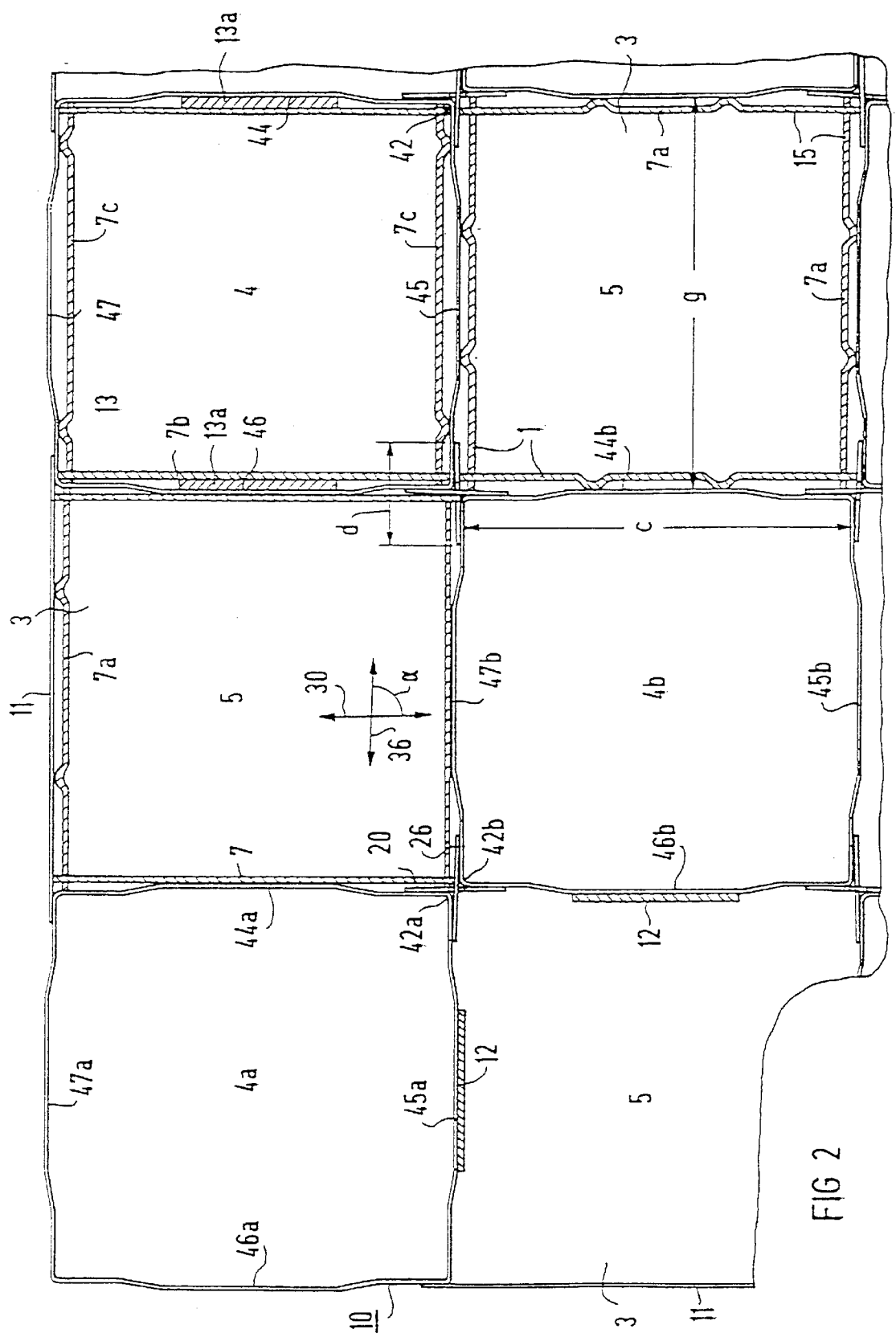
FIG. 2 is a fragmentary, sectional view taken parallel to a plane of a baseplate, showing the storage framework in a region of one of its corners.

According to FIG. 2, the structural wells in each case are disposed diagonally opposite one another, so that a checkered pattern is obtained. The figure illustrates an edge region of the storage framework at one corner. In the edge region of the storage framework, three structural wells 4 surround an interspace 3 which is closed relative to the outside through the use of an edge plate 11 and which, in addition to the structural wells 4, serves for receiving a non-illustrated fuel element in an intermediate position 5. An absorber well 15, composed of four plates 7, 7a made from boron-treated steel, is inserted into the interspace 3. Only one absorber well is illustrated for the sake of greater clarity. The plates 7, 7a are essentially planar and in each case run parallel to the side walls of the structural wells 4, 4b surrounding the interspace. Side walls 44 to 47 are outwardly beaded, so that the plates 7, 7a bear against the side walls, with the result that the position of the absorber well 15 within the interspace 3 is fixed. Moreover, sufficient space is provided at edges 42a, 42b of the structural wells 4 for the planar plates 7, 7a to engage in one another, i.e. to intermesh. FIG. 2 also illustrates how an absorber well 15 with beaded plates 7b or with planar plates 7c having spacers 13a is disposed in a structural well 4. Since the largely planar plates 7, 7a have bearing contact at least at particular points, the inner region of the interspace 3 is free for receiving a non-illustrated spent fuel element. As already explained with regard to FIG. 1, the structural wells 4 have guide strips 12 at their upper end 8a. The guide strips 12, only two of which are illustrated, run parallel to the side walls 44 to 47 and face into the interspace 3.

The side walls 44 to 47, as well as side walls 44a to 47a and 44b to 47b of the structural wells 4, 4a, 4b in each case are outwardly beaded, so that a clear width c of the structural wells coincides approximately with a clear width g of the interspaces 3. The widths correspond in each case to the fuel elements to be stored and may amount to between 140 mm and 380 mm.

The structural wells and side walls are designated in general by reference numerals 4 and 44 to 47 and in particular by reference numerals 4a, 4b and 44a to 47a, 44b to 47b. The structural wells 4 are connected to the structural wells 4 located opposite them through the first and second connecting elements 20 and 26. In each case two side walls 44a and 45a of a well 4a which form a common longitudinal edge 42a are assigned two side walls 47b and 46b of the diagonally opposite well 4b which form a common longitudinal edge 42b. The first connecting element 20 has the shape of a plate strip and connects the side wall 44a of the well 4a to that side wall 46b of the well 4b which is approximately parallel thereto. The second likewise strip-shaped connecting element 26 connects the side wall 45a of the well 4a to the side wall 47b of the well 4b.

The first connecting element 20 has high rigidity in the directions indicated by a double arrow 30 and running parallel to the flat side of the first connecting element 20. The second connecting element 26 has high rigidity in a direction 36 running approximately perpendicularly to the direction 30. An approximate right angle α between these two directions 30 and 36 preferably amounts to between 70° and 90°. It can be seen in the figure that the first and second strip-shaped connecting elements 20 and 26 do not run exactly parallel to or perpendicularly to the outer wall 10 and the side walls 44a, 45a, 46b and 47b, but in each case rest on surfaces of the side walls 44a, 45a, 46b and 47b at an acute angle β shown in FIG. 5. An offset S1 in an x direction and an offset S2 in a y direction between the structural wells 4a and 4b is thereby compensated. The offset is necessary in the region of the longitudinal edges 42a and 42b. The direction of the offset S1 is parallel to the x axis and the direction of the offset S2 is parallel to the y axis of a right-angled system of coordinates x-y which is oriented with its two axes parallel to the walls 44, 46 and 45, 47 of the structural wells 4. This offset S1, S2 is canceled again by the outwardly beaded side surfaces 44a, 44b to 47a, 47b of the structural wells 4a and 4b, so that the clear width c of the structural wells virtually coincides with the clear width g of an interspace 5a or of an intermediate position 5.

Figure 5:
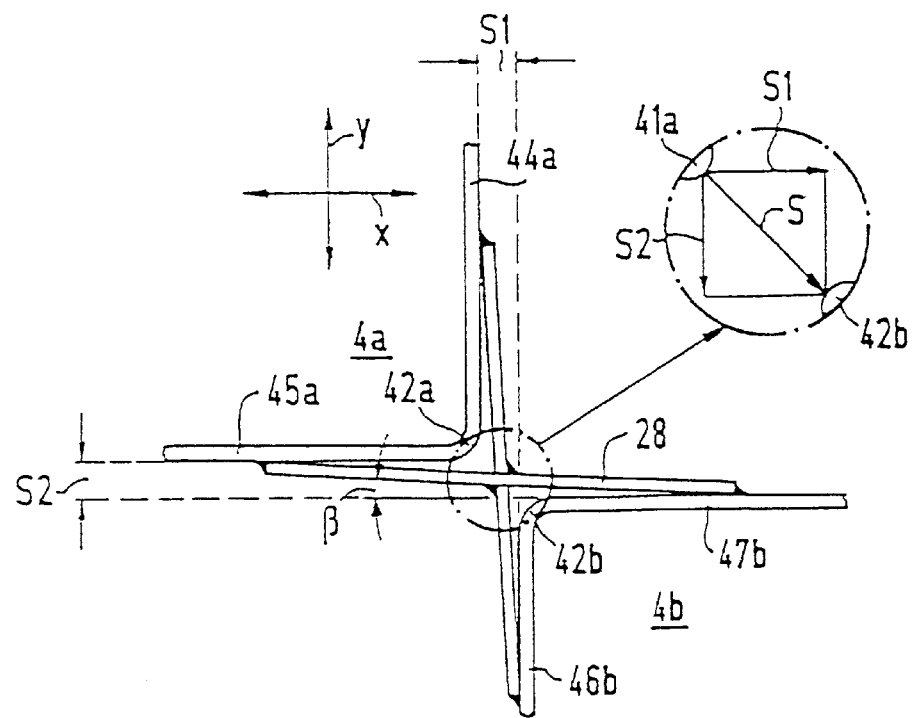
FIG. 5 is a sectional view taken parallel to the baseplate, showing a connection of two structural wells through intersecting connecting elements.

By virtue of the outwardly beaded surfaces of the side walls 44 to 47 of the structural wells 4, these side walls 44 to 47 are set back in the region of their longitudinal edges 42, as is seen from a center point of the interspace 3 which is surrounded by them, so that the risk of the connecting elements welded on there possibly catching on a fuel element during loading and unloading of the structural wells 4 or of the intermediate locations 5 is virtually ruled out. In FIG. 5, the offsets S1, S2 are shown separately and enlarged in a position vector diagram, wherein a resulting position vector S that is equal to a distance or gap between the two longitudinal edges 42a, 42b is obtained.

A width d of the strip-shaped first and second connecting elements 20 and 26 amounts to about 10 to 30%, of the clear width c of a structural well 4, which is 60 mm in the example. The wall thickness of the connecting elements 20, 26 is preferably 50% to 90% of the wall thickness of the structural wells 4. In the exemplary embodiment shown in the figure, a wall thickness of the connecting elements 20, 26 of about 1.5 mm is provided for a wall thickness of the structural wells 4 of 2 mm.

Figure 3:
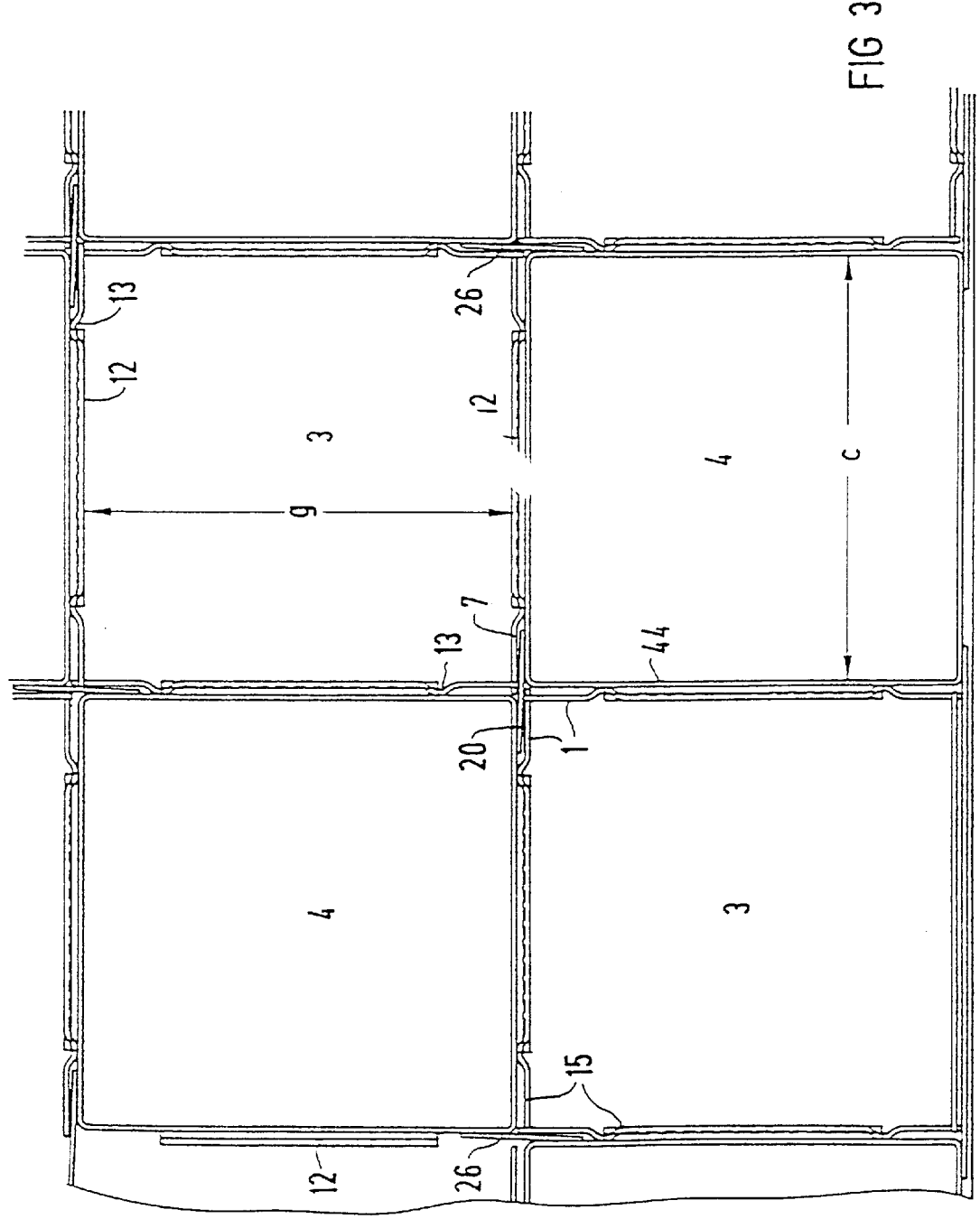
FIG. 3 is a fragmentary, sectional view taken parallel to the plane of the baseplate, showing the storage framework.

FIG. 3 illustrates a cross section through a storage framework in a similar way to FIG. 2, with like parts being designated by the same reference symbols. The structural wells 4 are formed from planar plates which merge into one another at the edges, in each case with a rounding. The structural wells 4 can be produced particularly simply. Structural wells 4 located diagonally opposite one another in each case are connected to one another in a mechanically stable manner through the use of a connecting element 20, with adjacent connecting elements 20 being extended in two different directions. The directions form an angle of 70° to 90°. An absorber well 15 composed of releasably intermeshed plates 7 in each case is disposed in the interspaces 3. The plates 7 run largely parallel to the side walls 44 to 47 of the structural wells and have edge beads 13, with which they bear against the respective side wall 44 to 47. The plates 7 may also be planar and may be spaced from the side walls 44 of the structural wells through corresponding spacers 13a shown in FIG. 2, so that the plates 7 engage in one another, i.e. intermesh, in the region of the longitudinal edges 42a seen in FIG. 2. As a result, the position of the absorber well 15 in the interspace 3 is fixed, and the absorber well 15 affords a sufficiently large amount of space for receiving a spent fuel element.

Figure 4:
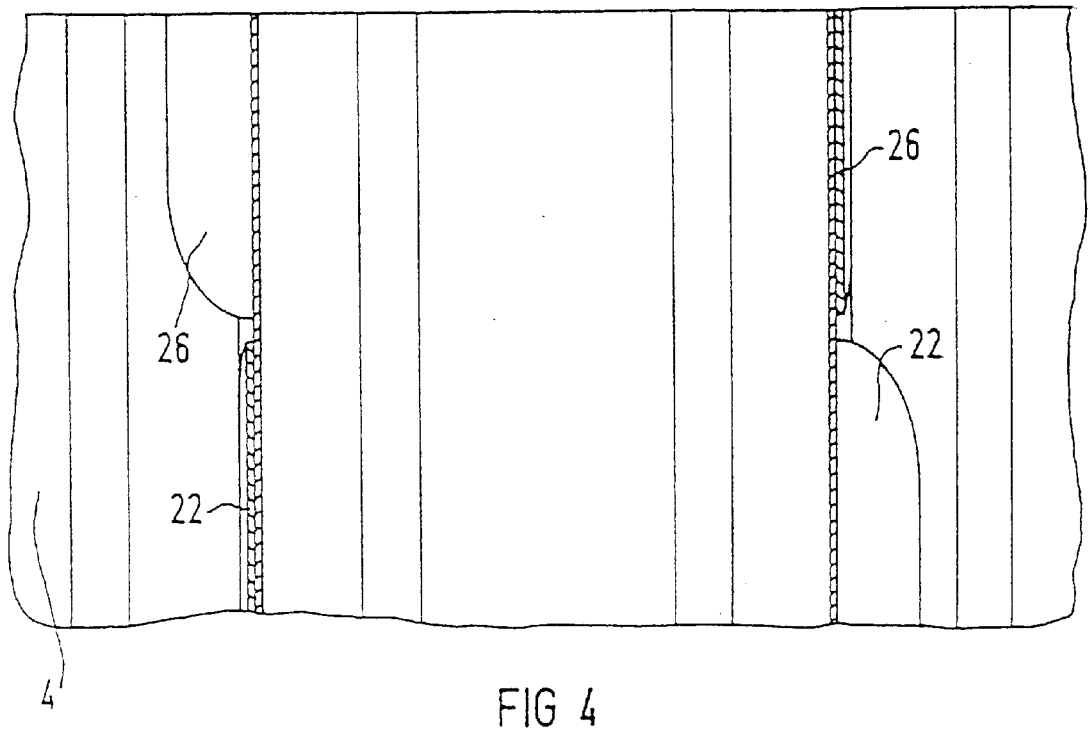
FIG. 4 is a fragmentary, sectional view taken perpendicular to the baseplate, showing an upper part of a storage framework with different connecting elements.

According to FIG. 4, first connecting elements 22 extend only in the lower region 6 of the structural wells 4 and do not reach as far as their top edge. These first connecting elements 22 likewise have a pointed or tapered shape at their free end projecting into the well interior, in order to prevent them from catching on the fuel elements during loading while using the first connecting elements 22. The second connecting elements 26 have a tapered or pointed shape at their end facing away from the end surface of the structural wells 4, in order to likewise avoid catching on the fuel elements during unloading.

FIG. 5 not only serves to explain the offsets S1, S2, but also shows an advantageous configuration with cross-shaped second connecting elements 28 that are welded to mutually confronting surfaces of the side walls 44a, 45a and 46b, 47b of the structural wells 4a and 4b. It can be seen in the figure that, in this exemplary embodiment too, the respective flat sides of the cross-shaped second connecting element 28 run at an acute angle β to the surfaces of the side walls 44a, 45a, 46b and 47b of the structural wells 4a and 4b).

Since the second connecting elements 28 are disposed only in the upper region of the storage framework, they may be mounted at a later stage from above. The cross-shaped connecting elements 28 may be welded in, as separate pieces of the length b (as seen in FIG. 1), between the structural wells 4 from above. However, they may also be obtained by welding the first connecting elements 20, which run through over the height a+b and are slotted at the top according to FIG. 5, to the second connecting elements 26 disposed there, or by welding short second connecting elements in two longitudinally divided halves onto slotted first connecting elements of the length a+b.

The invention is characterized by a fuel element storage framework for spent fuel elements of a nuclear power plant, in which the storage framework has structural wells that stand vertically on a baseplate and are disposed in a checkered manner. A neutron-absorbing structure, which is preferably an absorber well, is provided in the interspaces formed between the structural wells disposed in a checkered manner. Alternatively, the absorber well may also be inserted directly into a structural well. Placing a respective absorber well in the interspace and in the structural wells also makes it possible to store fuel elements having a relatively high radioactive radiation capacity, since two absorber layers (plates) are disposed one behind the other. This absorber well is composed of four intermeshed plates and is displaceable within the interspace relative to the structural wells, thus ensuring that the absorber well does not have a load-bearing function. The absorber well can therefore be produced from a boron-treated steel without any problem at all. A storage framework thus produced has a separation of load-bearing components, namely the structural wells, from the neutron-absorbing components, namely the absorber wells, with the result that separation is also achieved during the production of the different components and this production can thereby be carried out especially simply. In particular, the structural wells can be produced from known steels on a large scale. The interspaces between the structural wells are preferably dimensioned in such a way that, even after an absorber well has been inserted, there is sufficient room in the interspace for receiving a spent fuel element, so that a compact storage device for the space-saving storage of fuel elements is provided.

I claim:

1. A storage framework for nuclear reactor fuel elements, comprising:

a) a baseplate;

b) a plurality of structural wells of substantially rectangular cross section fastened on and standing upright on said baseplate, said structural wells disposed approximately diagonally opposite one another in a checkered manner, and each two of said structural wells disposed diagonally opposite one another spanning an interspace; and c) a neutron-absorbing structure with boron-containing steel plates disposed in at least one of an interspace and a structural well for displacement relative to said structural wells, each four of said steel plates forming a respective absorber well, said steel plates adjoining one another being connected releasably to one another, and said neutron-absorbing structure having spacers toward a respective one of said structural wells.

2. The storage framework according to claim 1, wherein said spacers are selected from the group consisting of strips, plates and edge beads.

3. The storage framework according to claim 1, wherein said plates form a substantially rectangular absorber well.

4. The storage framework according to claim 1, wherein said plates adjoining one another are intermeshed.

5. The storage framework according to claim 1, wherein at least some of said plates adjoin a respective structural well at least in a region of said plates.

6. The storage framework according to claim 1, wherein said structural wells have an end opposite said baseplate, and a guide strip is disposed at said end.

7. The storage framework according to claim 1, wherein each of said structural wells has side walls with longitudinal edges butting against one another at a corresponding one of said longitudinal edges, and at least one connecting element connecting at least some of said structural wells disposed diagonally opposite one another to one another along said mutually adjoining longitudinal edges with an offset, said at least one connecting element bridging a gap formed by said offset, and said at least one connecting element running in a given direction parallel to said baseplate.

8. The storage framework according to claim 7, including at least one other connecting element running in another direction parallel to said baseplate and bridging the gap formed by said offset, said given direction and said other direction forming an angle of between 70° and 90° therebetween.

* * * * *